Figure 1:
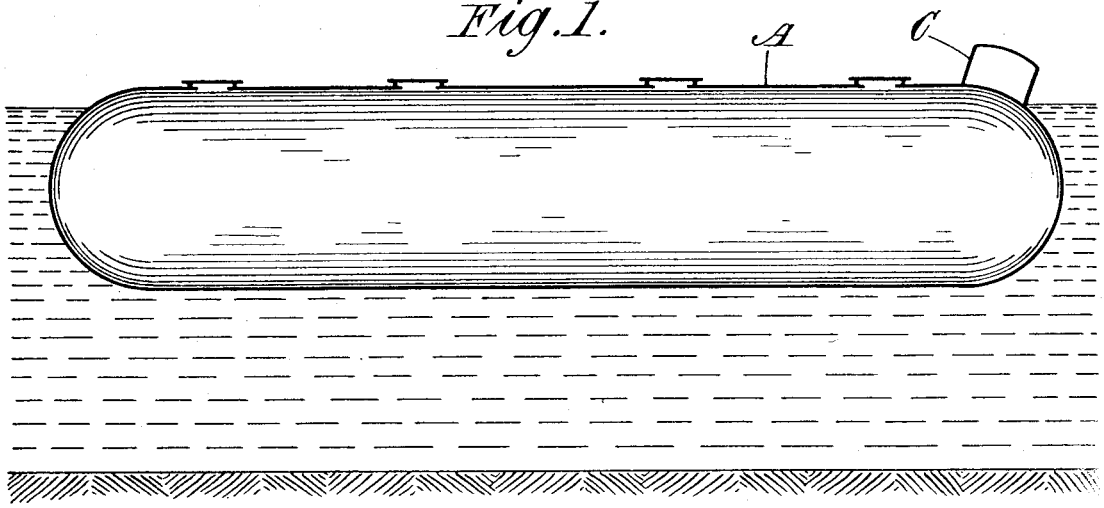

W. BOXFORD.
MARINE STORAGE TANK FOR OIL.
APPLICATION FILED SEPT. 25, 1914.

1,176,526.

Patented Mar. 21, 1916.
3 SHEETS—SHEET 1.

W. DOXFORD.
MARINE STORAGE TANK FOR OIL.
APPLICATION FILED SEPT. 25, 1914.
1,176,526.
Patented Mar. 21, 1916.
3 SHEETS—SHEET 2.
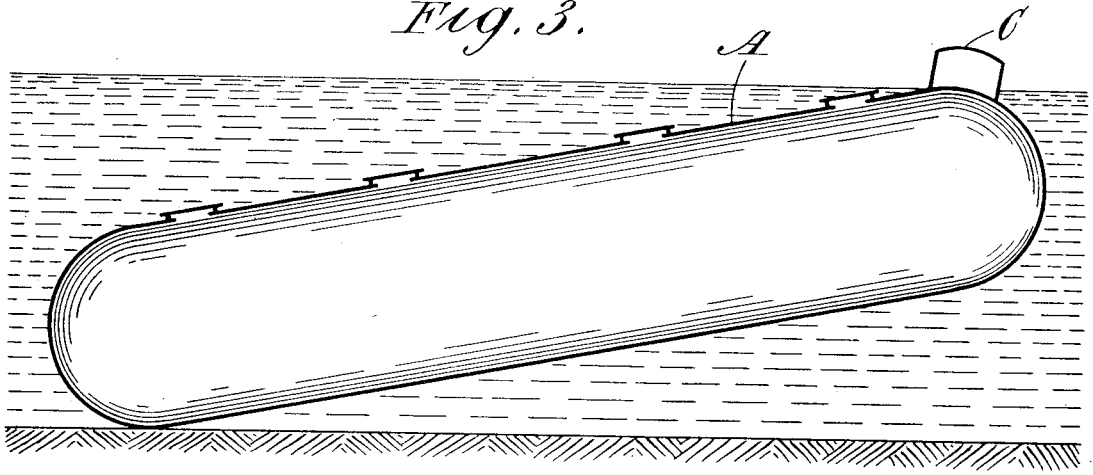
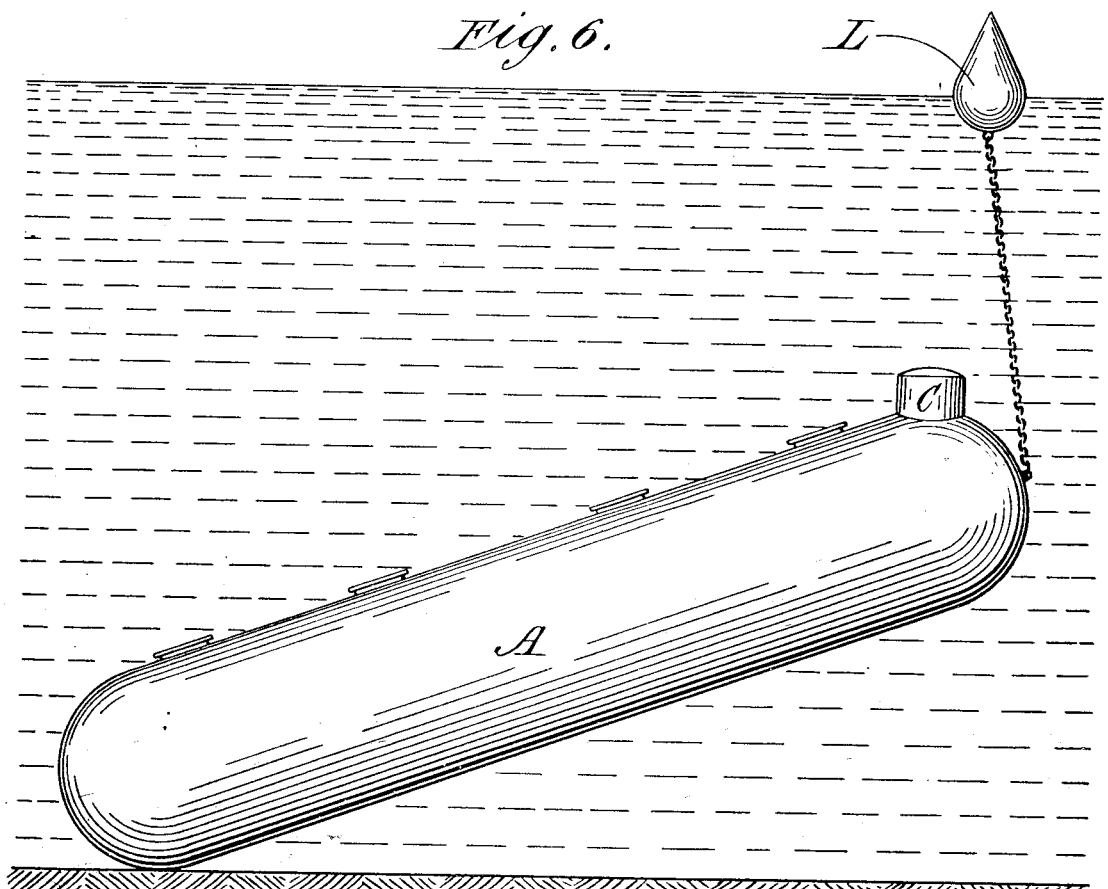

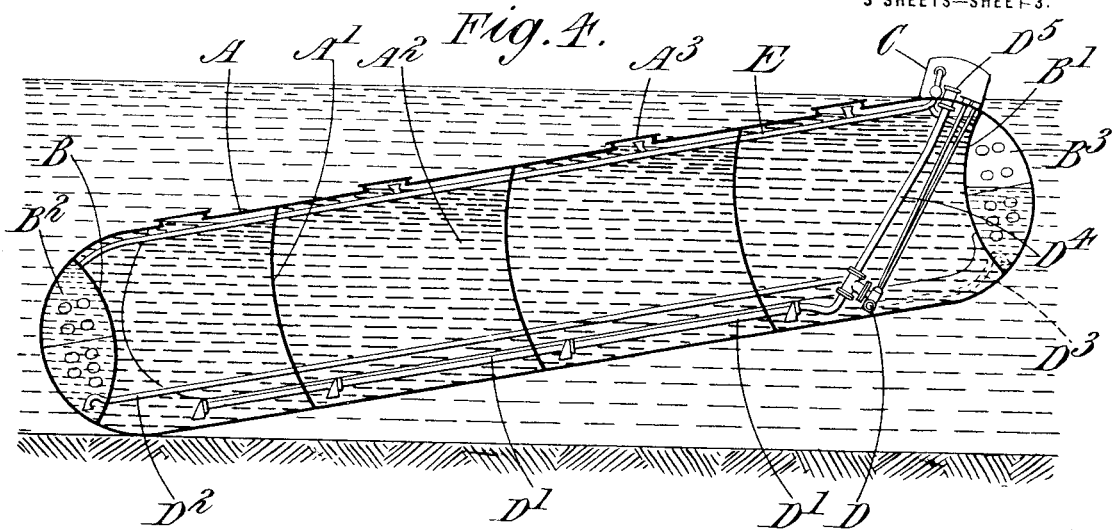
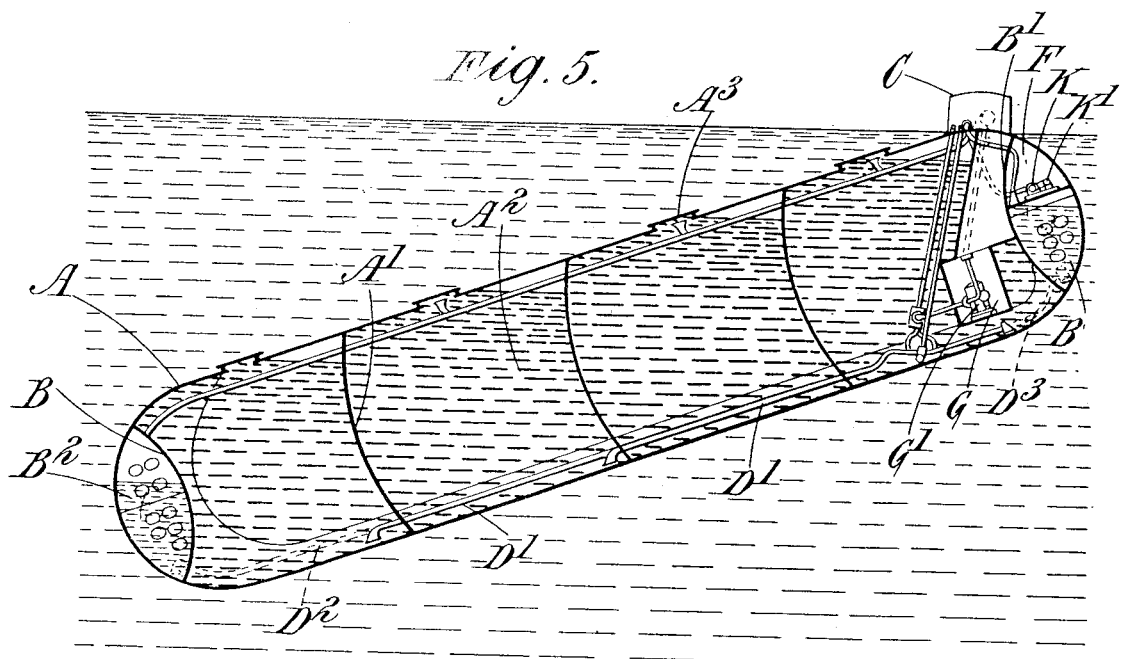

UNITED STATES PATENT OFFICE.

WILLIAM DOXFORD, OF SUNDERLAND, ENGLAND.

MARINE STORAGE-TANK FOR OIL.

1,176,526.  Specification of Letters Patent.  Patented Mar. 21, 1916.

Application filed September 25, 1914. Serial No. 863,522.

*To all whom it may concern:*

Be it known that I, WILLIAM DOXFORD, a subject of the King of England, residing in Sunderland, England, have invented certain new and useful Improvements in Marine Storage-Tanks for Oil, of which the following is a specification.

This invention relates to marine storage tanks for oil, of the kind so constructed that when loaded with oil they will float. A floating oil tank of the kind hitherto proposed is very vulnerable to aeroplane attack, and in this regard is particularly objectionable because the emerged portions, which provide the necessary reserve buoyancy and longitudinal stability, if they are to have sufficient effect in fresh water, become very conspicuous when the tank is afloat in salt water. It is thus very desirable to reduce the size of the emerged portions in order to reduce the target for attack, and the present invention has for its object such a reduction of exposed area.

According to this invention therefore there is provided a tubular storage tank for oil, to float when loaded, having its reserve of buoyancy in the body of the tank and adapted to be so ballasted as to submerge completely the major portion of its length and keep it inclined to the horizontal.

In the case of tanks as hitherto proposed, the reserve buoyancy has had to be sufficient to cope with the whole load and to permit the tank to change its floating position, as between fresh water and salt water, by a movement in which the tank, to all intents and purposes, moves parallel to itself. Reduction of the size of the target exposed is possible if reduction can be made in the amount of reserve buoyancy required, and this in turn can be done if the load with which the buoyancy has to deal can be reduced. To achieve this end by reducing the size of the tank itself is obviously undesirable, but if the tank be allowed to rest with one end upon the bed of the river or sea, the bed takes part of the load and so relieves the reserve buoyancy of some of its duty. With a tank buoyantly held in the water with its lower end supported by the bed, the amount of reserve buoyancy, whether provided within the tank itself or by a buoy attached to it, need not be nearly so great as when part of the load is not so supported by the bed.

According therefore to a further important feature of the invention there is provided a tubular storage tank for oil that, when loaded, and in a body of water, is supported as to one end upon the bed underlying the said body and as to the other end buoyantly, so as to maintain an inclined position or a position in which the length of the tank is upright.

The tank is preferably so constructed as to comprise means to give it buoyancy within or upon it and these means conveniently take the form of suitably disposed ballast or trimming chambers, for example chambers at each end of the tank. Instead of these chambers or in conjunction therewith reserve buoyancy may be given to the tank by means of a buoy attached to it.

In order to guard against complete submersion where partial submersion only is desired, the means provided to sink one end may be so proportioned that, when employed to their fullest extent, they are insufficient completely to submerge the tank.

The invention will now be described with the aid of the accompanying drawings, but it is to be understood that the construction shown is by way of exemplification of the invention and not of limitation.

Figure 2:
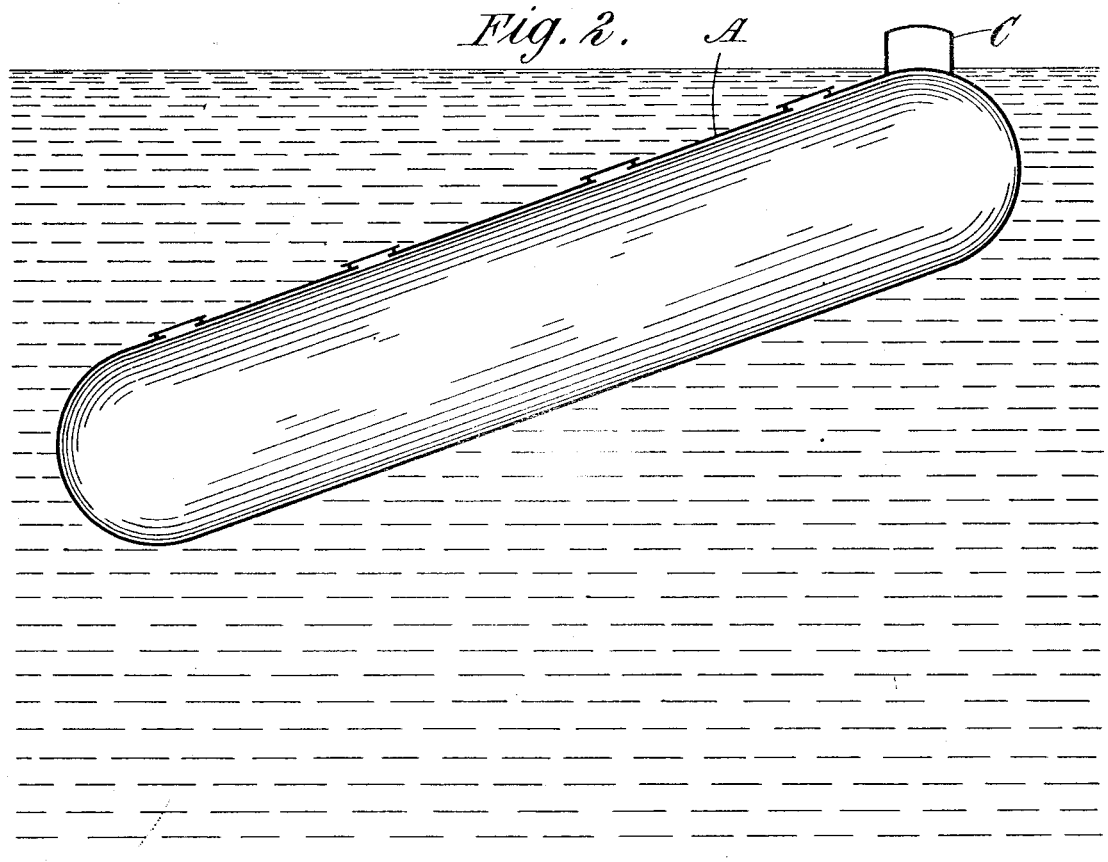

In the drawings—Figure 1 diagrammatically indicates a petroleum storage tank according to the present invention loaded and floating upon the surface of water; Fig. 2 diagrammatically indicates the tank with the major portion of its length submerged in deep water; Fig. 3 diagrammatically indicates the tank as in Fig. 2 but in shallow water so that one end rests upon the bottom. Fig. 4 indicates a particular construction of loading and discharging devices, Fig. 5 indicates a modified form of the means seen in Fig. 4, and Fig. 6 indicates a modified arrangement employing a buoy to provide the required reserve of buoyancy.

Like reference characters indicate like parts in all the figures.

The petroleum tank A shown in Figs. 1, 2 and 3 is provided with suitable trimming chambers adapted to contain water ballast, and with a valve-house C in which are situated the various valve-controlling mechanisms necessary for the filling and emptying of the tank and trimming chambers. The end at which the valve house is situated is herein termed the "after" end.

The tank A when filled with oil normally floats in a horizontal position as in Fig. 1, but when attack is to be apprehended, water is admitted to a trimming chamber at the forward end so as to sink that end, whereupon the tank assumes an inclined position and, if desired, and if the depth be not too great, the submerged end rests on the bottom and the other end floats at the surface as indicated in Fig. 2. With greater depths water may be admitted to a trimming chamber at the after end and the tank may float inclined or vertical either with that end just awash (see Fig. 2) or that end may be left showing above the water. By adjustment of the ballast the tank may have its floating position adjusted and, if desired, the whole tank may be made to sink to the bottom.

If the tank be not entirely submerged, the valve house is accessible and, when the tank is to be raised, compressed air is applied to expel water from the submerged trimming chamber so as to bring the tank into a horizontal floating position; compressed air may then be applied to the oil holds to expel that fluid from the corresponding discharge pipes whence it is conveyed by suitable pipes to the ship to be supplied therefrom.

If the tank has been completely submerged a diver is sent down to connect a supply pipe for compressed air, and, the ballast having been expelled by that means, the tank rises to the surface; alternatively, a flexible hose-pipe for compressed air may be permanently attached and its free end buoyed.

The reserve buoyancy, when one end rests on the bottom, as shown in Fig. 6, may be that of a buoy L attached to the tank instead of that due to a trimming chamber; or the buoy may act in conjunction with the chamber, the tank then being constructed as for example as described in connection with Fig. 4 or Fig. 5, in which two alternative constructions of tank indicating suitable methods of filling and emptying are illustrated and will now be described. The tank A is divided by transverse bulkheads $A^1$ into four holds $A^2$ for the petroleum, each of which is provided with an oil-tight hatchway $A^3$. Other bulkheads B and $B^1$ at either end of the tank A form, with the ends of the tank, trimming chambers $B^2$, $B^3$ to accommodate water ballast so that the ends may be ballasted to an adjustable degree. If desired the chambers may be of such a size that the whole tank may be sunk to the bottom, that is, their joint capacity may be greater than the reserve buoyancy of the tank in normal condition.

Adjacent to the chamber $B^3$ is the valve house C which is provided with a dome-shaped top that may, if desired, be armor-plated. The adjacent portion of the tank may also be armor-plated and the opposite end may be sheathed to prevent damage when it rests on the bottom.

In the arrangement indicated in Fig. 4, a sea valve chest D is connected on one side to the outside of the vessel and on the other by pipes $D^1$ $D^2$ $D^3$ to each of the holds $A^2$ and to the trimming chambers $B^2$, $B^3$. In this way water may be admitted for ballasting or trimming purposes, for each pipe is controlled by a separate valve. The four hold pipes are each provided with a branch $D^4$ leading to an oil valve chest $D^5$ in the valve house C, so that these pipes can also be used for loading and discharging the holds. Smaller valve-controlled pipes E are arranged near the top of the vessel and lead from each of the holds and trimming chambers to the valve house C. These pipes E are for admitting compressed air to the various compartments to discharge their contents and for permitting the outflow of air as the compartments are filled.

The various valve chests in the valve house C are provided with suitable connections by which they may be joined to flexible hose pipes through which the petroleum may be loaded or discharged or the compressed air supplied.

Alternative means for dealing with the oil or the water ballast in the holds and trimming chambers will now be described with reference to Fig. 5. A portion of the trimming chamber $B^3$ is divided off to form a compartment F for an electric motor, for example as at $K^1$, which is connected by properly insulated leads to a switch-board in the valve house C. A compartment G is built in the hold next the trimming chamber $B^3$ and in it is a pump $G^1$ connected by means of suitable gearing to the motor. The pump is also connected by pipes to the valve house C and to each of the holds. Thus the contents of the holds may be discharged by means of this electrically driven pump when the latter is connected to a source of power on board the ship which is to be supplied with oil.

An air compressor K, and the electric motor $K^1$, to drive it, are provided in the motor room to deal with the contents of the trimming chambers by means of compressed air as in the case of the tank described with relation to Fig. 4.

If desired, means may be provided to enable the tanks to be discharged by compressed air as in the previous construction.

What I claim as my invention and desire to secure by Letters Patent is:—

1. The combination with a tubular storage tank for oil, of trimming means whereby when in a body of water the tank may be inclined with one end emerged, and discharging means on the emerged portion in communication with the oil space in the tank.

2. The combination with a buoyant tubular storage tank for oil, of ballasting means to sink one end when in a body of water, the other end remaining emerged, and discharging means on the emerged portion in communication with the oil space in the tank.

3. The combination with a tubular storage tank for oil, of a ballast chamber to sink one end, a buoyancy chamber to lift the other, an intermediate oil space, and discharging means at the end lifted by the buoyancy chamber which are in communication with the oil space.

4. The combination with a tubular storage tank for oil, of a ballast chamber incorporated in one end of the tank, a buoyancy chamber incorporated in the other, an intermediate oil space and discharging means at the end lifted by the buoyancy chamber which are in communication with the oil space.

5. The combination of a tubular storage tank for oil with means to sink one end to the bottom of a body of water and a buoyancy device of a buoyancy such that when the said end is on the bottom that device will support the other end above the bottom.

6. The combination of a tubular storage tank for oil with means to sink one end to the bottom of a body of water and with a buoy distinct from but operatively connected to the tank and of a buoyancy such that when the said end is on the bottom that device will support the other end above the bottom.

7. A tubular storage tank for oil provided with a ballast chamber at one end, a buoyancy chamber at the other, an intermediate oil space subdivided into compartments, and valves at the end lifted by the buoyancy chamber which communicate with each oil compartment.

8. A tubular storage tank for oil provided with a ballast chamber at one end, a buoyancy chamber at the other, an intermediate oil space subdivided into compartments, valves at the end lifted by the buoyancy chamber which communicate with each oil compartment and water ballast discharge connections at the end adjacent to the oil valves.

9. The combination with a tubular storage tank for oil of means whereby when in a body of water the tank may be inclined with part of the apparatus emerged, and discharging means on the emerged portion in communication with the oil space in the tank.

In testimony whereof I have signed my name to this specification in the presence of two subscribing witnesses.

WILLIAM DOXFORD.

Witnesses:
  H. NIXON,
  A. MITCHINSON.